United States Patent

Ng et al.

Patent Number: 6,133,717
Date of Patent: *Oct. 17, 2000

[54] METHODS AND APPARATUS FOR SYNCHRONIZING A PLURALITY OF POWER SUPPLIES

[75] Inventors: William Ng, Leominster; Bernhard Schroter, Upton, both of Mass.

[73] Assignee: Digital Equipment Corporation, Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/164,416

[22] Filed: Sep. 30, 1998

[51] Int. Cl.⁷ ..................................................... G05F 1/573
[52] U.S. Cl. ............................ 323/288; 323/284; 323/271
[58] Field of Search .................................... 323/282, 288, 323/284, 285, 271

[56] References Cited

U.S. PATENT DOCUMENTS

| | | | |
|---|---|---|---|
| 5,001,620 | 3/1991 | Smith | 363/89 |
| 5,615,097 | 3/1997 | Cross | 363/84 |

OTHER PUBLICATIONS

"Product & Applications Handbook 1996–96," Unitrode Integrated Circuits Corporation, Merrimack, NH, pp. 6–158 to 6–165, Jan. 1995.

*Primary Examiner*—Shawn Riley
*Attorney, Agent, or Firm*—Hamilton, Brook, Smith & Reynolds, P.C.

[57] ABSTRACT

A technique involves broadcasting a pulse signal to synchronize oscillating signals used by multiple power supplies to provide output voltages. The technique involves charging and discharging respective capacitors of the multiple power supplies at respective rates to provide the oscillating signals. Each of the respective capacitors is charged until a voltage across that capacitor reaches a respective upper threshold and subsequently discharged until the voltage across that capacitor reaches a respective lower threshold. The technique further involves broadcasting, from at least two of the power supplies, a pulse signal to a synchronization connection coupled to each of the respective capacitors to modify the respective rates for charging and discharging the respective capacitors based on the pulse signal such that oscillating signals become synchronized.

15 Claims, 7 Drawing Sheets

METHODS AND APPARATUS FOR SYNCHRONIZING A PLURALITY OF POWER SUPPLIES

BACKGROUND OF THE INVENTION

Some computers use multiple power supplies such as pulse width modulation (PWM) power supplies to provide power separately to various components. In general, a PWM power supply includes a PWM circuit and a power stage. The PWM circuit forms an internal oscillating signal, and uses the internal oscillating signal to generate a PWM signal. The PWM circuit then outputs the PWM signal to the power stage which provides a power supply output voltage based on the duty ratio of the PWM signal. Generally, increasing the duty ratio of the PWM signal increases the output voltage. Conversely, decreasing the duty ratio of the PWM signal decreases the output voltage.

When the internal oscillating signals of multiple PWM power supplies are left unsynchronized in a computer, signaling difficulties may occur. In particular, random electromagnetic interference (EMI) created by the PWM power supplies may influence the operation of the computer. In some situations, the interference (or noise) may be strong enough to corrupt particular signals or data causing the computer to operate incorrectly.

Synchronization of the PWM power supplies (e.g., synchronization of the internal oscillating signals) reduces the randomness of the EMI generated by the power supplies. Accordingly, such interference becomes more predictable, and the difficulties it causes can be dealt with in a controlled manner (e.g., using appropriate filters, or increasing particular signal tolerances).

One conventional approach to synchronizing PWM power supplies is to connect the PWM power supplies in a master/slave configuration. In such a configuration, the master power supply has the fastest oscillating signal, and each slave power supply has a slower oscillating signal. If there is no clear master power supply, the oscillating signal of one of the power supplies is purposefully made faster than the others. During operation, the master power supply uses a master power supply oscillating signal, and each slave power supply speeds up the frequency of its oscillating signal to match that of the master power supply.

Another conventional approach is to connect the PWM power supplies in a daisy chain (or loop) configuration such that each power supply drives the next. That is, the oscillating signal of each PWM power supply in the chain drives the oscillating signal of the next PWM power supply in the chain. In this configuration, there is no master power supply, and the oscillating signals tend to synchronize over time.

SUMMARY OF THE INVENTION

It is difficult to control the frequencies of internal oscillating signals of pulse width modulation (PWM) power supplies configured in a master/slave configuration. In particular, it is difficult to reduce these frequencies, as occasionally required to maintain the frequencies within particular tolerances. If the master power supply is adjusted such that it no longer provides the fastest oscillating signal, the slave power supply will no longer be synchronized with the master power supply. Accordingly, any further reduction in the frequencies of the oscillating signals of the power supplies requires an adjustment to the oscillating signal of the slave power supply. As a result, multiple adjustments to the PWM power supplies may be required when lowering the frequencies of the oscillating signals.

Furthermore, multiple PWM power supplies connected in a daisy chain configuration provide limited design flexibility. Another difficulty with daisy chained PWM power supplies is that a problem with one power supply in the chain may affect all of the other power supplies. In particular, if the oscillating signal of one PWM power supply is formed improperly, the oscillating signals of the other power supplies may be formed improperly as well. Accordingly, a problem in a single power supply may cause problems in all of the other power supplies in the chain. Furthermore, since each power supply in the chain will experience the problem, the power supply causing the problem be difficult to identify.

In contrast, an embodiment of the invention is directed to a technique for synchronizing oscillating signals used by multiple power supplies to provide output voltages. The technique involves broadcasting a pulse signal from at least two power supplies. In particular, the technique involves charging and discharging respective capacitors of the multiple power supplies at respective rates to provide the oscillating signals. Furthermore, the technique involves broadcasting, from at least two of the multiple power supplies, a pulse signal to a synchronization connection coupled to each of the respective capacitors to modify the respective rates for charging and discharging the respective capacitors based on the pulse signals such that the oscillating signals become synchronized.

The technique may further involve broadcasting an additional pulse signal from an external pulse generator coupled to the synchronization connection.

Preferably, charging and discharging the respective capacitors involves charging each of the respective capacitors until a voltage across that capacitor reaches a respective upper threshold, and discharging each of the respective capacitors until the voltage across that capacitor reaches a respective lower threshold.

Preferably, broadcasting the pulse signal involves providing a current spike that causes the voltage across a particular capacitor to reach a respective upper threshold. In particular, a charging current provided to the particular capacitor is greater than a discharging current simultaneously provided to the capacitor by a discharging current source.

It is unnecessary for the current spike to cause all of the respective capacitors to reach their respective upper thresholds. Rather, once the current spike has caused one respective capacitor of a particular power supply to reach its respective upper threshold, that particular power supply will provide another current spike to enable one or more other power supplies to reach their upper thresholds.

Broadcasting the pulse signals reduces a frequency of a first oscillating signal of a first power supply, and increases the frequency of a second oscillating signal of a second power supply. In particular, when one power supply broadcasts a pulse signal, the power supply broadcasting the pulse signal has its oscillating frequency slowed, and a power supply receiving the pulse signal has its oscillating frequency increased. Accordingly, the frequencies of the multiple power supplies tend to average out.

One synchronizable power supply, embodying the invention, includes a power train circuit that provides an output voltage according to an oscillating signal, and a pulse width modulation (PWM) circuit coupled to the power train circuit. The PWM circuit includes a capacitor and an oscillator, coupled to the capacitor, that charges and discharges the capacitor at a particular rate to provide the oscillating signal. The capacitor is charged until a voltage across the capacitor reaches an upper threshold and is subsequently discharged by the oscillator until the voltage across that capacitor reaches a lower threshold. The oscillator provides a pulse signal that modifies the particular rate for charging and discharging the capacitor such that the oscillating signal becomes synchronized with the pulse signal. The PWM circuit further includes a synchronization circuit, coupled to the capacitor, that receives the pulse signal.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
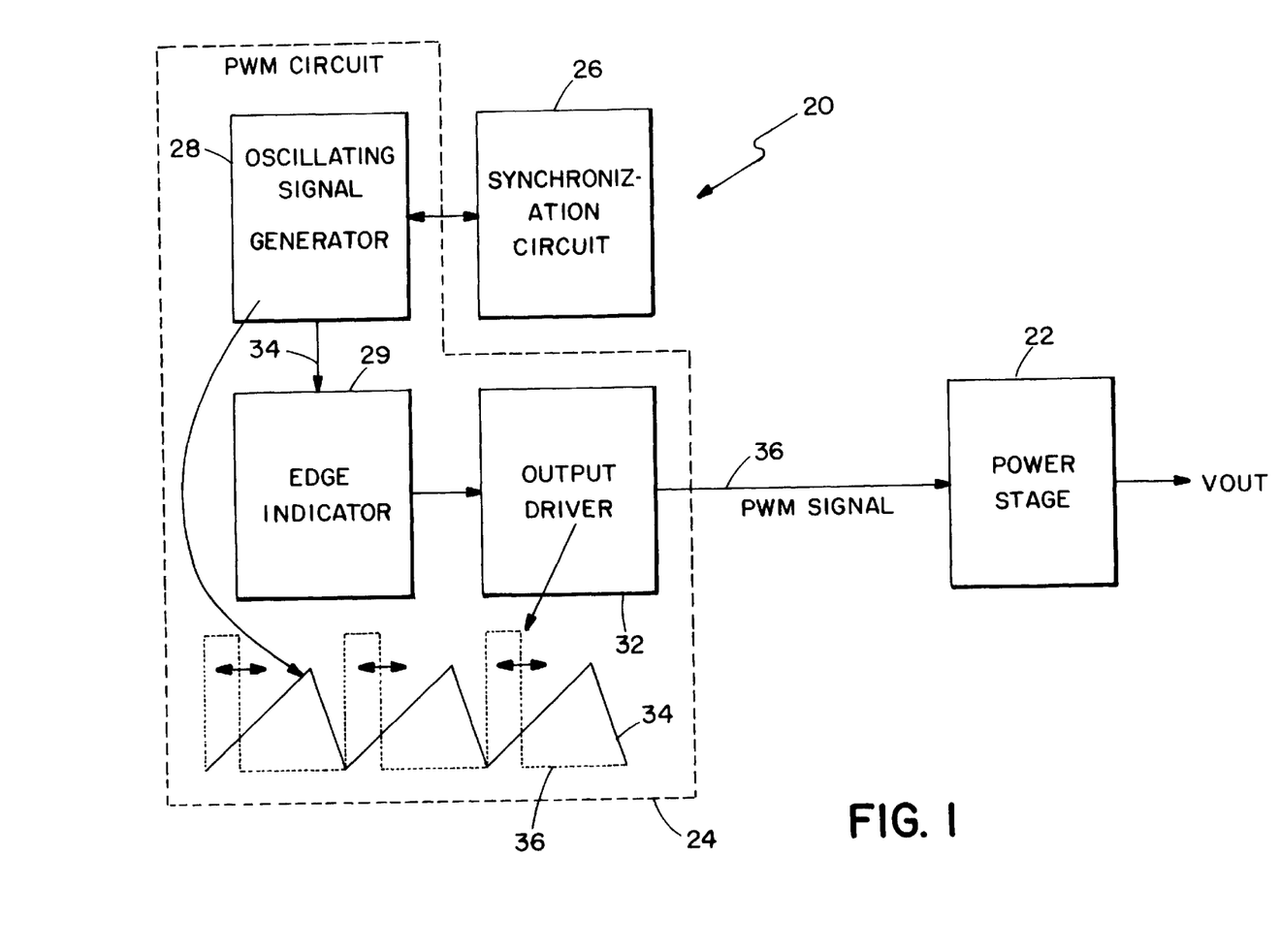
FIG. 1 is a block diagram of a synchronizable power supply that synchronizes an oscillating signal based on a pulse signal.

An embodiment of the invention is directed to a synchronizable pulse width modulation (PWM) power supply that synchronizes its internal oscillating signal according to pulse signals provided by at least two of the power supplies. As shown in FIG. 1, such a power supply 20 includes a power stage 22, a PWM circuit 24 and a synchronization circuit 26. The PWM circuit 24 includes an oscillating signal generator 28 (or oscillator), an edge indicator 29 and an output driver 32.

During operation, the synchronization circuit 26 provides one or more pulse signals to the oscillating signal generator 28. In response, the oscillating signal generator 28 provides an internal oscillating signal 34. Preferably, the oscillating signal 34 is a ramp signal that increases and decreases in a fairly linear manner. The edge indicator 29 indicates to the output driver 32 where the leading edge of the PWM signal 36 should begin. In particular, the edge indicator 29 identifies the bottoms of the oscillating signal 34 (i.e., the low points of the ramp signal) to the output driver 32. The output driver 32 generates a PWM signal 36 having leading edges 37 that coincide with the bottoms of the oscillating signal 34, as shown in FIG. 1.

The power stage 22 receives the PWM signal 36 from the output driver 32 of the PWM circuit 24, and provides a power supply output voltage, VOUT, according to the PWM signal 36. In particular, the duty ratio of the PWM signal 36 determines the level of the output voltage VOUT.

It should be understood that the pulse signal provided by the synchronization circuit 26 controls the frequencies of the oscillating signal 34 and the PWM signal 36 since the oscillating signal 34 and the PWM signal 36 synchronize with the pulse signal.

Figure 2:
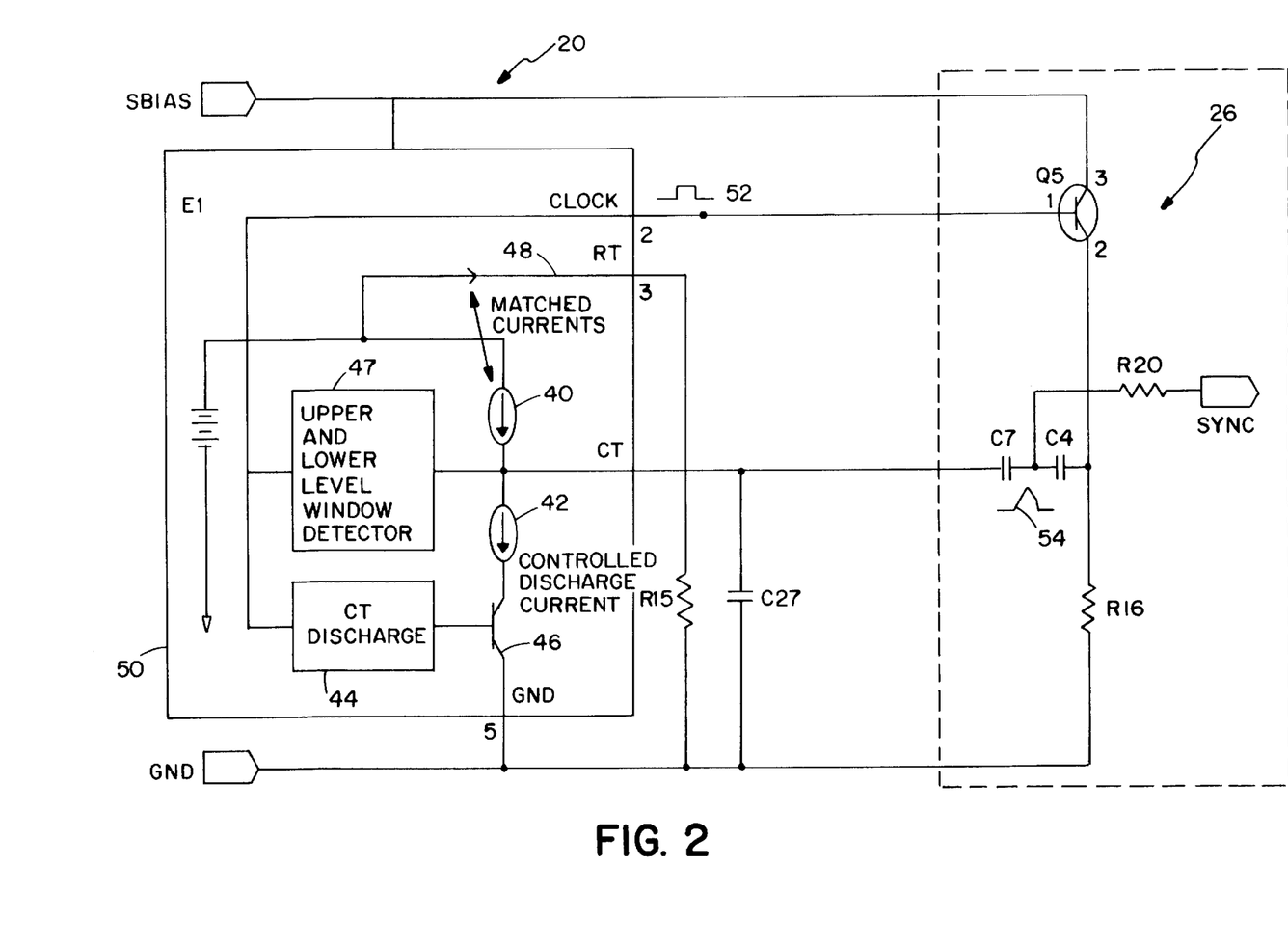
FIG. 2 is a schematic diagram of the synchronizable power supply of FIG. 1.

FIG. 2 shows a schematic diagram of the synchronizable power supply 20 of FIG. 1. The oscillating signal generator 28 of the PWM circuit 24 includes a resistor R15, a capacitor C27, a charging current source 40, a discharging current source 42, a current discharge circuit 44 and a transistor 46. The charging current source 40 matches current provided through connection 48 (and through resistor R15). In general, the components within the box 50 are available in off-the-shelf integrated circuits (ICs) such as the High Speed PWM Controller, Model No. UC3823A, provided by Unitrode Integrated Circuits Corporation of Merrimack, N.H.

The synchronization circuit 26 includes a transistor Q5, a capacitor C7, a capacitor C4, a resistor R16 and a resistor R20. The synchronization circuit 26 connects to a synchronization pin (SYNC) that operates as an input/output pin (i.e., a pin capable of either inputting a signal or outputting a signal), and a ground pin (GND). Other components of the power supply 20 also connect to the ground pin (GND), as shown in FIG. 2. The power stage 22 is not shown in FIG. 2 to simplify the figure.

Figure 3:
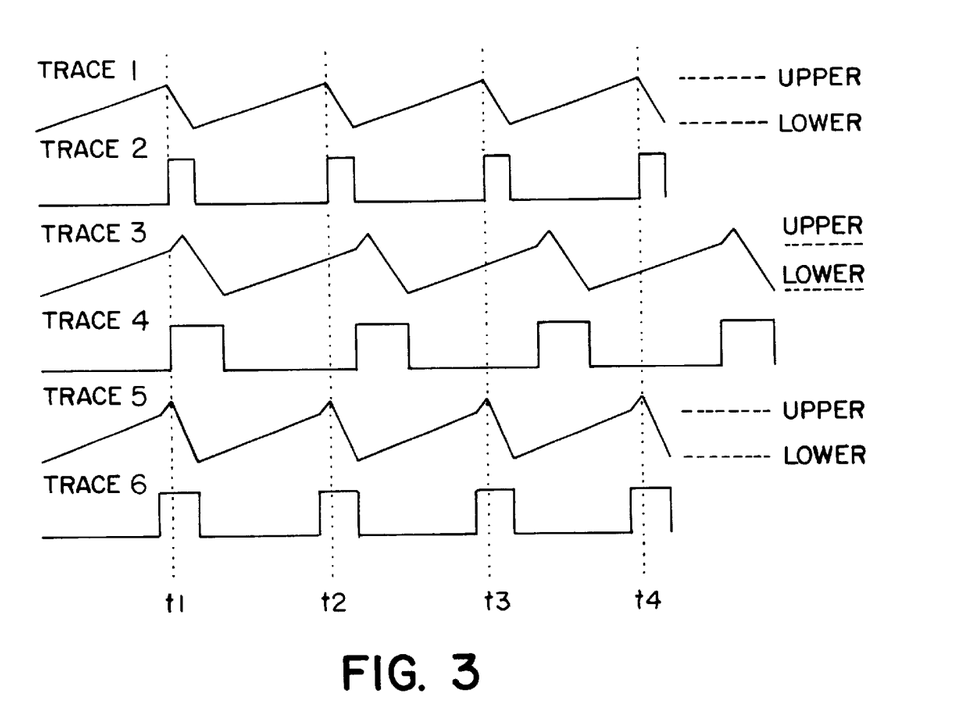
FIG. 3 is a timing diagram of various signals of the synchronizable power supply of FIGS. 1 and 2.

With reference to FIG. 3, the operation of the synchronizable power supply 20 will be further explained beginning with a description of how the PWM circuit 24 operates without the synchronization circuit 26. TRACE 1 shows the oscillating signal 34 provided by the oscillating signal generator 28 without the synchronization circuit 26. In particular, the charging current source 40 charges the capacitor C27 in a fairly linear manner by matching the current through R15 (or alternatively a constant current source). The window detector 30 measures the voltage across C27. When the voltage across C27 reaches the upper threshold, the window detector 47 provides a clock pulse 52 (TRACE 2) with an asserted level. Additionally, the window detector 30 disables the charging current source 40 and enables the discharging current source 42. When the voltage across C27 reaches the lower threshold, the window detector 30 instructs provides the clock pulse 52 (TRACE 2) with a deasserted level. To start the next cycle, the window detector 30 further disables the discharging current source 42 and enables the charging current source 40. During the disabling and enabling of the current sources 40,42, the current discharge circuit 44 and transistor 46 operate in a coordinated manner with the current sources 40,42 to charge and discharge the capacitor C27.

It should be understood that the above-described enabling/disabling procedure repeats such that the oscillating signal 34 and the clock pulse 52 appear as TRACE 1 and TRACE 2, respectively. Furthermore, it should be understood that the frequency of the oscillation signal 34 sets the switching frequency for the power conversion process. That is, the frequency of the oscillation signal 34 sets the frequency for the PWM signal 36 which ultimately sets the level of the power supply output voltage VOUT by controlling its duty ratio.

A description of the power supply operation will now be provided factoring in the synchronization circuit 26. As the rising portion of the oscillating signal 34 reaches the upper threshold, the charging current source 40 becomes disabled and the discharging current source 42 becomes enabled. At this time, the upper and lower window detector 30 generates the clock pulse 52. The clock pulse 52 is buffered by transistor Q5 which sends a current spike 54 through capacitors C4 and C7 during the rising edge of the clock pulse 52. The current spike 54 increases the rising portion of the oscillation signal 34 above the upper threshold despite the fact that the charging current source 40 is disabled and the discharging current source 42 is enabled. In particular, the current spike 54 is larger than the controlled discharge current such that the rising portion of the oscillating signal 34 continues until the edge of the clock pulse 52 stops rising. TRACE 3 shows the oscillating signal 34 including an associated current spike 54.

At the peak of the current spike 54, capacitors C7 and C4 are partially charged. Then, as the current spike 54 starts to decline (or fade), C27 begins to discharge. As the oscillating signal 34 reaches the lower threshold, Q5 turns off, and C4 and C7 discharge through R16. When the oscillating signal 34 reaches the lower threshold, the charging current source 40 is enabled again, and the discharging current source 42 is disabled again, and the process repeats. Accordingly, the oscillating signal 34 appears as shown by TRACE 3, and the clock pulse 52 appears as shown in TRACE 4.

It should be understood that the current spike 54 provided by the synchronization circuit 26 is feeds back into the PWM circuit 24, and is also available externally on the synchronization pin. Accordingly, the oscillating signal 34 includes the affect of the current spike 54 (i.e., the peak).

Preferably, capacitor C7 is substantially smaller than capacitor C27. Accordingly, a small portion of the charging current for C27 is diverted to discharge C4 and C7. In particular, the amount of current diverted from C27 is proportional to the capacitance of C27.

It should be understood that the presence of the synchronization circuit 26 slows down the frequency of the oscillating signal 34, as shown by a comparison of TRACE 1 and TRACE 3. The resistor R15 and/or the capacitor C27 can be adjusted to increase the frequency of the oscillating signal 34 to counteract the slowing affect of the synchronization circuit 26, as shown in TRACE 5. The clock pulse 52 associated with the oscillating signal (TRACE 5) is shown in TRACE 6. Note that the frequency of the clock pulse 52 in TRACE 6 still matches the frequency of the oscillating signal 34 in TRACE 5.

It should be understood that the output voltage VOUT of the synchronizable power supply 20 is adjustable by controlling the duty ratio of the PWM signal.

Figures 4, 4A:
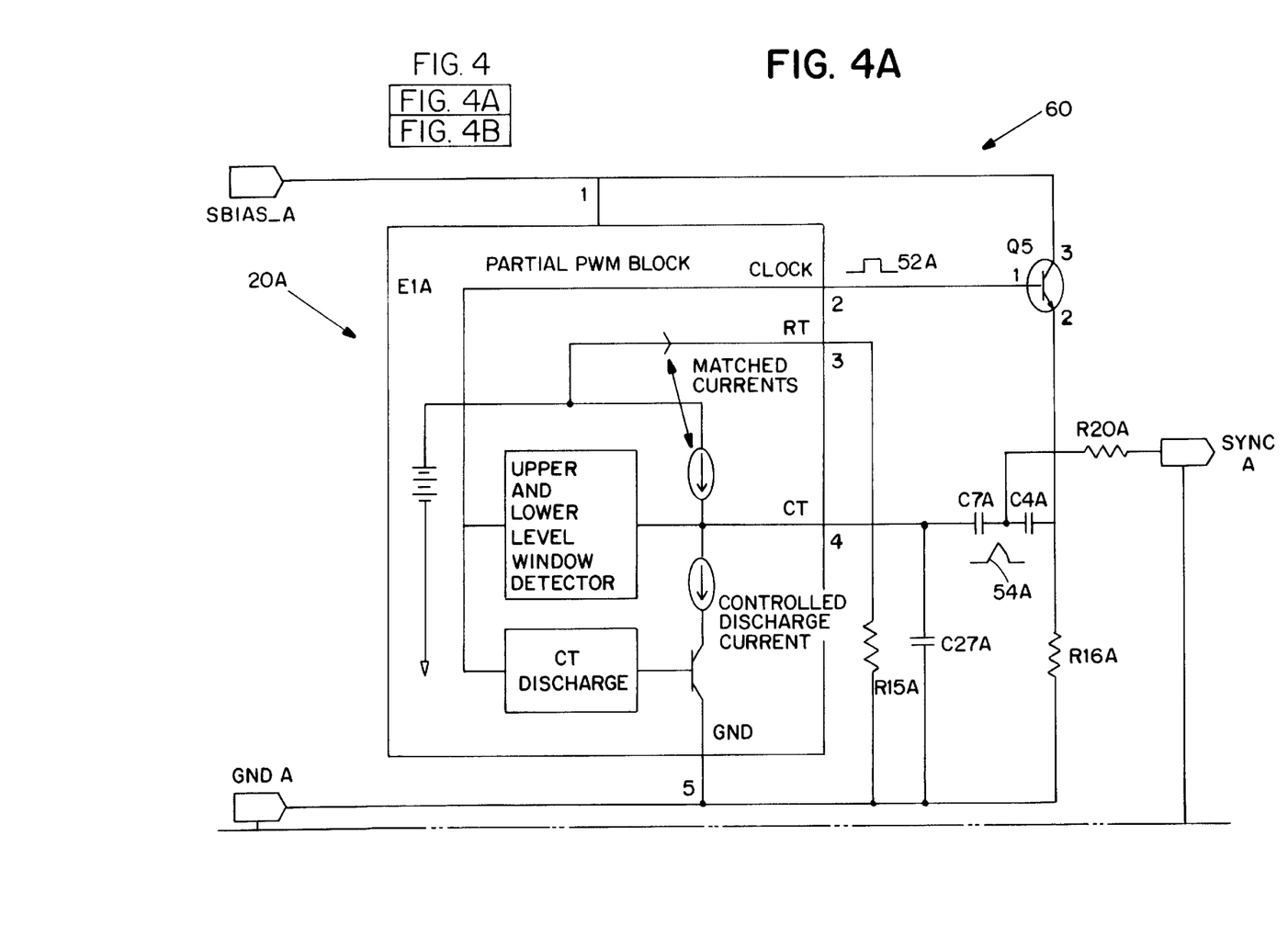
FIGS. 4A and 4B are is a schematic diagram of two synchronizable power supplies connected together.
Figure 4B:
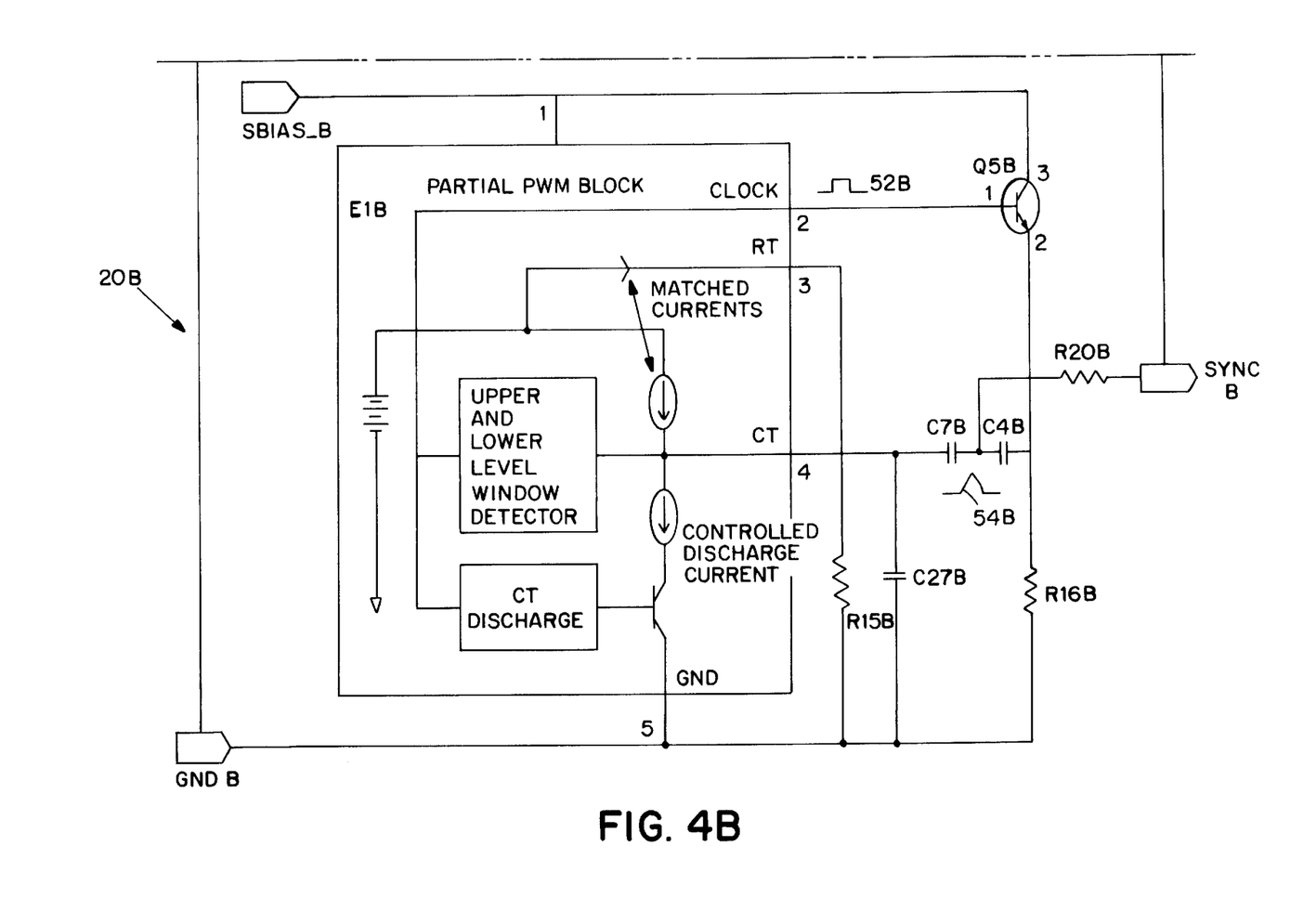

An embodiment of the invention is directed to power supply system 60 having multiple power supplies (e.g., power supplies 20A,20B), as shown in FIG. 4A and 4B. At least two power supplies provide a pulse signal. Since the system 60 includes two power supplies, each power supply of the system 60 provides a pulse signal- The synchronization circuits 26A,26B of the multiple power supplies are connected at their synchronization pins SYNCA,SYNCB, and at their ground pins GNDA,GNDB. A description of the operation of this system will be provided shortly. But first, a short description of the individual operations of power supplies 20A,20B will be provided.

Figure 5:
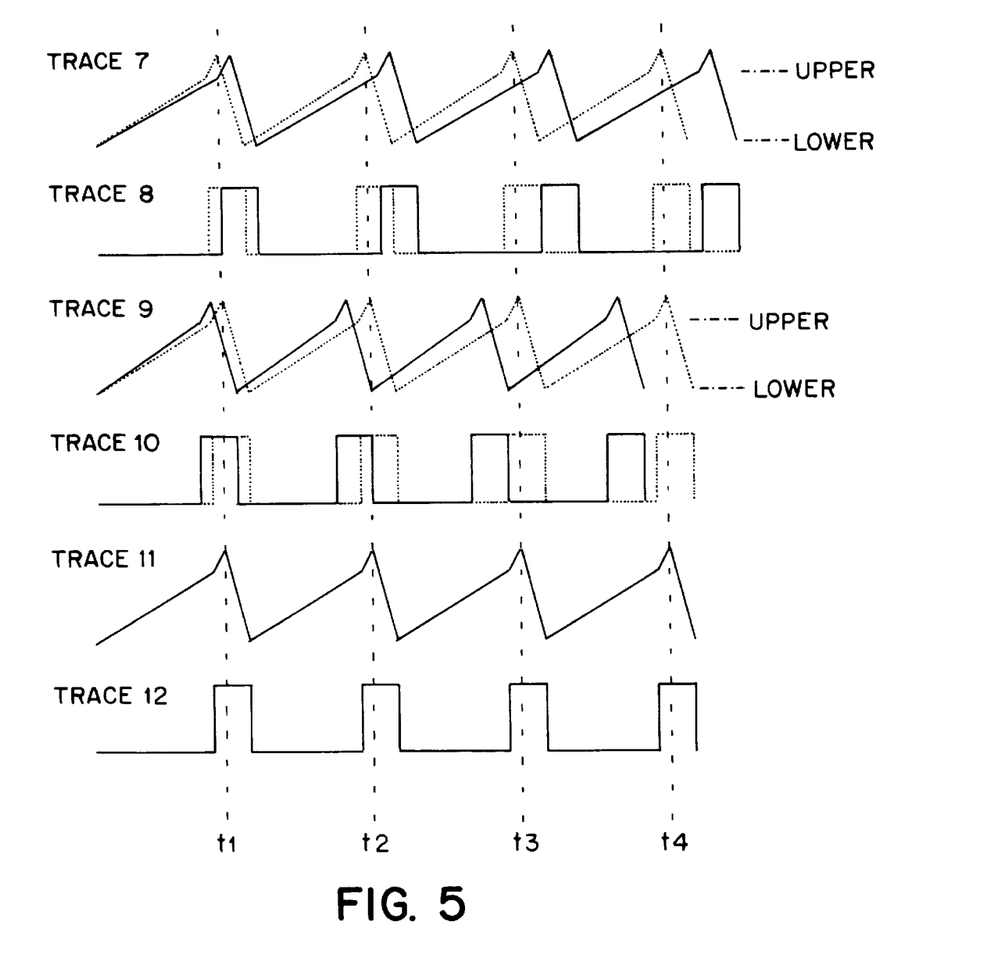
FIG. 5 is a timing diagram of various signals of the two synchronizable power supplies of FIG. 4.

Reference is now made to FIG. 5 which shows signals for the power supplies 20A,20B. When the power supplies 20A,20B run as standalone modules (i.e., with the synchronization pins SYNCA,SYNCB disconnected), power supply 20A runs at a slower frequency. In particular, for the power supply 20A, the solid line in TRACE 7 is the oscillation signal 34A, and the solid line in TRACE 8 is the clock pulse 52A. Similarly, for the power supply 20B, the solid line in TRACE 9 is the oscillation signal 34B, and the solid line in TRACE 10 is the clock pulse 52B. During operation, the components of both power supplies 20A,20B generate output voltages and are controllable (i.e., synchronizable) as explained in the general description of the power supply 20 of FIGS. 1 and 3.

When the synchronization pins SYNCA,SYNCB are connected together, the frequencies of the oscillation signal 34A and the clock pulse 52A increase as shown by the dotted lines, shifted to the right, in TRACE 7 and TRACE 8, respectively. The frequency increases in the power supply 20A are due to a pulse signal received from the power supply 20B. Additionally, when the synchronization pins SYNCA, SYNCB are connected together, the frequencies of the oscillation signal 34B and the clock pulse 52B decrease as shown by the dotted lines, shifted to the left, in TRACE 9 and TRACE 10, respectively. The frequency decreases in the power supply 20B are due to the power supply 20B providing the pulse signal to the power supply 20A. In particular, when the pulse signal (the current spike 54B) of power supply 203 is distributed between the two power supplies, the pulse signal has less affect on power supply 20B, and an added affect on power supply 20A.

As shown in FIG. 5, the frequencies of the oscillating and clock pulses 34A,34B,52A,52B synchronize as shown in TRACE 11 (the oscillating signals 34A,34B for power supplies 20A,20B) and TRACE 12 (the clock pulse 52A, 52B for power supplies 20A,20B). Accordingly, the signals tend towards the average of their frequencies when running as standalone modules.

Figure 6:
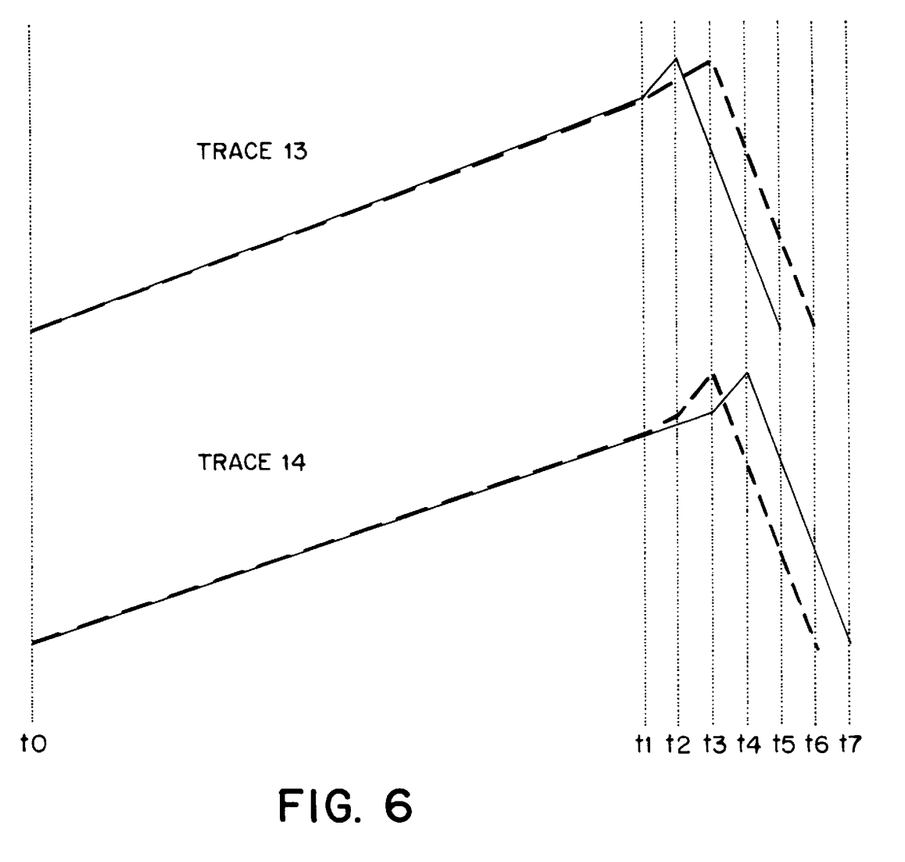
FIG. 6 is a detailed timing diagram of particular signals of FIG. 5.

FIG. 6 shows enlarged views of the oscillating signals 34A and 34B for the power supplies 20A and 20B, respectively. In particular, the solid line in TRACE 13 is an enlarged view of the oscillating signal 34B when the power supply 20B is a standalone module, and the dotted line is an enlarged view of the oscillating signal 34B when the power supply 20B is connected within the power supply system 60 (see FIG. 4A and 4B). Similarly, the solid line in TRACE 14 is an enlarged view of the oscillating signal 34A when the power supply 20A is a standalone module, and the dotted line is an enlarged view of the oscillating signal 34A when the power supply 20A is connected within the power supply system 60.

As shown in FIG. 6, the frequency of the oscillating signal 34A is slower than that of the oscillating signal 34B. In particular, at time t1, the capacitor C27B is charged to its upper threshold. The clock pulse 52B from the window detector 30B buffered by transistor Q5B provides a current spike 54B through C7B as described above for the single power supply 20. Some of the current spike 54B is diverted through the components of the synchronization circuits 26A,26B (i.e., R20B, R20A, C7A, C27A) before the voltage across capacitor C27A reaches the upper threshold.

It should be understood that, when the power supply 20B operates in the power supply system 60, the slope of the oscillating signal 34B is decreased between t1 and t2 because some of the current spike 54B is diverted to the other power supply 20A. Accordingly, the oscillating signal 20B is slower when the power supply 20B is connected in the power supply system 60.

Similarly, when the power supply 20A operates in the power supply system 60, the slope of the oscillating signal 34A is increased between t1 and t2 because some of the current spike 54B from power supply 20B helps charge C27A at a slightly faster rate. Until the voltage across C27A reaches the upper threshold, the current spike 54B from the power supply 20A pushes the oscillating signal 34A to its peak. Accordingly, the oscillating signal 34A is faster when the power supply 20A is connected in the power supply system 60.

As explained above, diverting a portion of the current spike from one power supply to another slows down the power supply that provides the current spike and speeds up the power supply that receives the current spike. In one embodiment, the power supply system 60 further includes an external pulse generator 62 that provides an external pulse signal (in addition to the pulse signals provided by the power supplies 20A,20B). In this case, the pulse signals provided by the power supplies as well as the external pulse signal contribute to the modifications to the oscillating signals. In particular, the oscillating signals of the power supplies synchronize based on all of the pulse signals including the external pulse signal.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, the circuitry that generates the clock pulse 52 does not need to be part of the PWM circuit 24. Rather, the clock pulse 52 can be generated externally by a clock pulse generator.

Additionally, the power supply system shown in FIG. 4 includes two power supplies 20A,20B. Additional power supplies can be connected to the system simply by connecting a synchronization pin of each new power supply to the synchronization pin connection. The pulse signal provided by the fastest power supply should be strong enough to push the oscillating signal of another power supply from below its upper threshold above its upper threshold. When the other power supply reaches its upper threshold, it will provide another pulse signal (or contribute to the first pulse signal) to assist the oscillating signal of another power supply in reaching its upper threshold, and so on.

Furthermore, as described above, injecting pulses to generate positive spikes resulted in increasing the frequency of the power supplies.

Additionally, embodiments described above have been explained in the context of a computer. The embodiments are not limited to computers. The power supplies and power supply systems may be used to power other electrical systems as well.

What is claimed is:

1. A method for synchronizing a plurality of oscillating signals used by multiple discrete electronic power supplies, wherein each individual one of the multiple discrete power supplies includes a capacitor means, to provide a plurality of synchronized output voltages as power supply, the method comprising the steps of:

providing oscillating electronic signals by charging and discharging respective capacitor means of each individual one of the multiple discrete power supplies at respective rates by using a synchronization circuit with a synchronization connection for synchronizing said oscillating signals;

from at least two of the multiple power supplies, broadcasting a pulse signal to said synchronization connection which is coupled to each of the respective capacitors to modify the respective rates for charging and discharging the respective capacitors based on the pulse signals such that the oscillating signals become synchronized; and using said synchronized oscillating signals to generate a plurality of synchronized output voltages.

2. The method of claim 1 further comprising the step of:

broadcasting at least an additional pulse signal from an external pulse generator coupled to the synchronization connection.

3. The method of claim 1 wherein the step of charging and discharging includes the step of:

charging each of the respective capacitors of each individual one of the multiple discrete electronic power supplies until a voltage across that capacitor reaches a respective upper threshold, and discharging each of the respective capacitors until the voltage across that capacitor reaches a respective lower threshold.

4. The method of claim 3 wherein the step of broadcasting includes the step of:

providing a current spike that causes the voltage across a particular one respective capacitor to reach a respective upper threshold for the particular respective capacitor.

5. The method of claim 4 wherein the step of providing the current spike includes the step of:

providing a charging current to the particular one respective capacitor that is greater than a discharging current simultaneously provided to the particular respective capacitor by a discharging current source.

6. The method of claim 3 wherein the step of broadcasting includes the step of:

providing a current spike that causes the voltage across less than all of the respective capacitors of each individual one of the multiple power supplies to reach their respective upper thresholds.

7. The method of claim 1 wherein the step of broadcasting a pulse signal includes the step of:

reducing a frequency of a first oscillating signal, and increasing the frequency of a second oscillating signal.

8. An electric power supply system, comprising:

a synchronization circuit with a synchronization connection; and a plurality of power supplies, each individual one including:

respective capacitors, respective oscillators, coupled to the respective capacitors, that charge and discharge the respective capacitors at respective rates to provide oscillating signals, at least two of the respective oscillators providing a pulse signal that modifies the respective rates for charging and discharging the respective capacitors such that the oscillating signals become synchronized, and a synchronization circuit with a synchronizing connection for receiving said pulse signal and synchronizing the oscillating signals of all the plurality of power supplies.

9. The system of claim 8 further comprising;

an external pulse generator, coupled to the synchronization connection, disposed to provide at least an additional pulse signal.

10. The system of claim 8 wherein further each of the respective capacitors in each individual one of the plurality of power supplies is charged by a respective oscillator until a voltage across that capacitor reaches a respective upper threshold and subsequently discharged by the respective oscillator until the voltage across that capacitor reaches a respective lower threshold.

11. The system of claim 10 wherein the respective synchronization circuits for receiving said pulse signal are adapted to receive, as the pulse signal, a current spike that causes the voltage across a particular respective capacitor to reach a respective upper threshold for the particular respective capacitor.

12. The system of claim 11 wherein the respective oscillators for providing a pulse signal further include respective discharging current sources; and wherein the respective synchronization circuits are adapted to provide, as a pulse signal, a charging current to the particular respective capacitor that is greater than a discharging current simultaneously provided to the particular respective capacitor by a respective discharging current source.

13. The system of claim 10 wherein the respective synchronization circuits for receiving said pulse signal are adapted to provide, as a pulse signal, a current spike that causes the voltage across less than all of the respective capacitors to reach their respective upper thresholds.

14. The system of claim 8 wherein the respective synchronization circuits for receiving said pulse signal are adapted to provide, as a pulse signal, a current spike that reduces a frequency of a first oscillating signal, and increases the frequency of a second oscillating signal.

15. Apparatus for synchronizing a plurality of electrical power supplies for providing a second plurality of synchronized output voltages, each power supply comprising:

a power train circuit that provides an output voltage according to an oscillating signal; and a pulse width modulation circuit, coupled to the power train circuit, including:

a capacitor, an oscillating signal generator, coupled to the capacitor, that charges and discharges the capacitor at a particular rate to provide the oscillating signal, the capacitor being charged until a voltage across the capacitor reaches an upper threshold and subsequently discharged by the oscillator until the voltage across that capacitor reaches a lower threshold, the oscillating signal generator providing a pulse signal that modifies the particular rate for charging and discharging the capacitor such that the oscillating signal synchronizes with the pulse signal, and a synchronization circuit, coupled to the oscillating signal generator to receive the pulse signal whereby the respective oscillating signals of all power supplies are synchronized to provide the second plurality of synchronized output voltages.

* * * * *